US006955366B2

(12) United States Patent
Tokarev

(10) Patent No.: US 6,955,366 B2
(45) Date of Patent: Oct. 18, 2005

(54) HEAVY BED TRANSPORTING DEVICE

(76) Inventor: Nikolay N. Tokarev, 8121 SE. Malden Ct., Portland, OR (US) 97216

( * ) Notice: Subject to any disclaimer, the term of this patent is extended or adjusted under 35 U.S.C. 154(b) by 26 days.

(21) Appl. No.: 10/392,954

(22) Filed: Mar. 21, 2003

(65) Prior Publication Data

US 2004/0183267 A1 Sep. 23, 2004

(51) Int. Cl.⁷ ................................................ B62B 3/00
(52) U.S. Cl. ............................ 280/47.34; 280/47.131; 280/47.35; 280/79.11
(58) Field of Search .......................... 280/47.18, 47.19, 280/47.131, 47.35, 79.11, 79.2, 79.3, 47.34; 248/188.5, 188.8; 5/600, 308, 931, 510; 188/19, 188/79.57, 1.12

(56) References Cited

U.S. PATENT DOCUMENTS

| | | | | |
|---|---|---|---|---|
| 2,876,020 | A * | 3/1959 | Murchie | 280/79.11 |
| 3,533,640 | A * | 10/1970 | Fator | 280/79.11 |
| 3,567,068 | A * | 3/1971 | Carfizzi | 280/79.2 |
| 3,580,601 | A | 5/1971 | Miles | |
| 3,879,796 | A * | 4/1975 | Whyte | 5/510 |
| 3,918,733 | A * | 11/1975 | Macho et al. | 280/79.11 |
| 4,098,518 | A | 7/1978 | Minkoff | |
| 4,210,341 | A | 7/1980 | Minkoff | |
| 5,299,659 | A | 4/1994 | Imbeault | |
| 5,358,264 | A * | 10/1994 | Hewitt | 280/79.11 |
| 5,361,569 | A * | 11/1994 | Schupman et al. | 280/47.131 |
| 5,580,207 | A | 12/1996 | Kiebooms | |
| 6,223,864 | B1 * | 5/2001 | Phelps et al. | 188/19 |
| 6,473,921 | B2 * | 11/2002 | Brooke et al. | 5/600 |
| 6,520,460 | B2 * | 2/2003 | Hallberg et al. | 248/188.5 |

* cited by examiner

*Primary Examiner*—Hau Phan
(74) *Attorney, Agent, or Firm*—Richard C. Litman

(57) ABSTRACT

A heavy bed transporting device having a pair of dolly devices for moving collapsible hospital beds. Each dolly device has a horizontal base member with a pair of wheels attached to the lower surface thereof and a connecting structure formed on the surface of said base member configured to operatively engage and secure the hospital bed thereto. The front dolly device is equipped with swivel-mounted wheels, while the rear dolly device has fixed unidirectional wheels and a manual braking system. The connecting structures are adaptively formed to engage and secure different configurations of hospital bed frames, including both manual and electric hospital bed frames.

5 Claims, 7 Drawing Sheets

HEAVY BED TRANSPORTING DEVICE

BACKGROUND OF THE INVENTION

1. Field of the Invention

The present invention relates to bed transporting devices, and particularly to a dolly for moving heavy, collapsible hospital beds.

2. Description of the Related Art

Hospitals, nursing homes and other medical facilities often use heavy, unwieldy steel beds for their patients and residents. Frequently, there is a need to move, store or clean these beds in a time efficient manner. However, the beds often weigh upwards of 1,000 lbs., and are also very bulky, making them difficult to transport. Although many of them are equipped with wheels, they are often too bulky to be wheeled through doorways or narrow corridors and must therefore be rotated or maneuvered through these passageways. Such activities often require considerable effort on the part of multiple staff members and can easily lead to injuries.

Various bed moving devices have been developed for the purpose of transporting heavy beds. These devices include elaborate hydraulic or electrically powered wheeled devices, as well as simple bracketed skating devices that attach to the bed frame. U.S. Pat. No. 5,299,659, issued Apr. 5, 1994 to Imbeault, describes a hydraulically powered bed transporting apparatus with a moveable lower support frame which is connected to a vertical, displaceable bed supporting frame. Lower bed support arms engage a side member of a bed, while an upper strap is connected to an opposed side member of the bed. The strap is wound about a drum which, when actuated by hydraulic pistons, causes the bed to tilt vertically against the supporting frame. The apparatus is supported by four unidirectional casters for rolling the apparatus on a flat surface.

U.S. Pat. No. 5,580,207, issued Dec. 3, 1996 to Kiebooms et al., shows an electrically powered device for moving wheeled beds consisting of a moveable frame, a lifting mechanism and a steering mechanism. A bed is loaded onto this device by wheeling the device under the bed and then activating a lifting mechanism which engages the underframe of the bed. The bed can then be pulled or pushed and steered in any direction.

Other bed transporting devices are simpler in design and function. They include dolly or skate devices that attach to the bed frame. U.S. Pat. Nos. 4,098,518 and 4,210,341, issued Jul. 4, 1978 and Jul. 1, 1980, respectively, to Minkoff, describe a bed transporting apparatus having a pair of dolly devices. Each dolly is an elongated base plate with swivel-mounted casters or wheels attached underneath. The base plate is further equipped with an attachment member to engage and secure the hospital bed thereto. U.S. Pat. No. 3,580,601, issued May 25, 1971 to Miles, shows a skate device for transporting large flat objects with large surface areas. The device comprises an elongated base member with a pair of brackets mounted on the surface thereof. The brackets operatively clamp onto the object and the object is wheeled on a set of rollers. Although the aforementioned inventions are used to transport beds or bed frames, they are generally limited to moving fully assembled beds which are larger and more difficult to maneuver into smaller spaces.

None of the above inventions and patents, taken either singly or in combination, is seen to describe the instant invention as claimed. Thus a heavy bed transporting device solving the aforementioned problems is desired.

SUMMARY OF THE INVENTION

The invention disclosed herein relates to a transport device having a pair of dolly devices, front and rear, uniquely adapted for transporting collapsible hospital beds. The front dolly has a horizontal base member with a pair of swivel-mounted wheels attached thereto. The rear dolly similarly has a horizontal base member, but is equipped with fixed-mount unidirectional wheels and a set of manual brakes. Each dolly has a connecting structure disposed on the upper surface thereof configured to operatively engage and secure the hospital bed thereto.

The swivel-mounted wheels attached to the front dolly device each have a bracket rotatably attached to the horizontal base member and a wheel rotatably attached to the bracket. The connecting structure which engages and secures the bed frame to the dolly devices includes one or more retaining elements. In one embodiment, a pair of retaining elements are disposed on opposite sides of the dolly, and each element has two semi-circular slots which receive protruding metal knobs disposed at the base of a particular type of bed frame. In a second embodiment, the retaining element includes a vertical member with two horizontal prongs connected thereto. These prongs slide into horizontal slots disposed at the end of a vertical bed post member in an electrical hospital bed frame. In both cases the connecting structure is specially adapted to secure the invention to the particular configuration of bed frame being used.

In use, the bed is broken down into separate frame elements, each of which is set in a vertical position. A pair of dolly devices are then attached to the respective frame elements. In the first embodiment, the dollies are attached to the bed by inserting the metal knobs found at the base of the frame element into the semi-circular slots disposed on opposite sides of the invention. A retaining pin is then inserted through a chamber disposed between the semi-circular slots, such that the pin extends across the knobs, securing them in place. A pair of straps attach to opposite sides of the bed frame element, which are used to suspend the detachable headboard and footboards of the bed. A pair of elastic cords may be optionally employed to secure the mattress to the side of one of the bed frame elements.

In the second embodiment, the dolly devices are specially adapted to receive an electric hospital bed which similarly detaches into two separate frame elements. Each of these frame elements has a vertical post with horizontal slots at its end, which slide over the horizontal prongs that form the retaining structure. A strap is then wrapped around the post and retaining structure, securing the frame element in place.

In addition, the rear dolly device having unidirectional wheels is equipped with a manual braking system. The system comprises two U-shaped levers, one for each wheel, which frictionally adhere to the wheels when raised into the "on" position.

Accordingly, it is a principal object of the invention to provide a transport means for moving heavy hospital beds on a pair of dolly devices.

It is another object of the invention to provide a quick and convenient method of engaging the hospital bed frame to the invention by providing a connecting structure that is specifically adapted to engage a particular configuration of hospital bed frame.

It is a further object of the invention to provide a braking mechanism that will enable an operator to immobilize the invention by manually raising a U-shaped handle attached to the outer axle support member of the rear wheels.

Still another object of the invention is to reduce the number of people required to move a hospital bed by providing a steering mechanism for moving the bed through any type of door or hallway.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
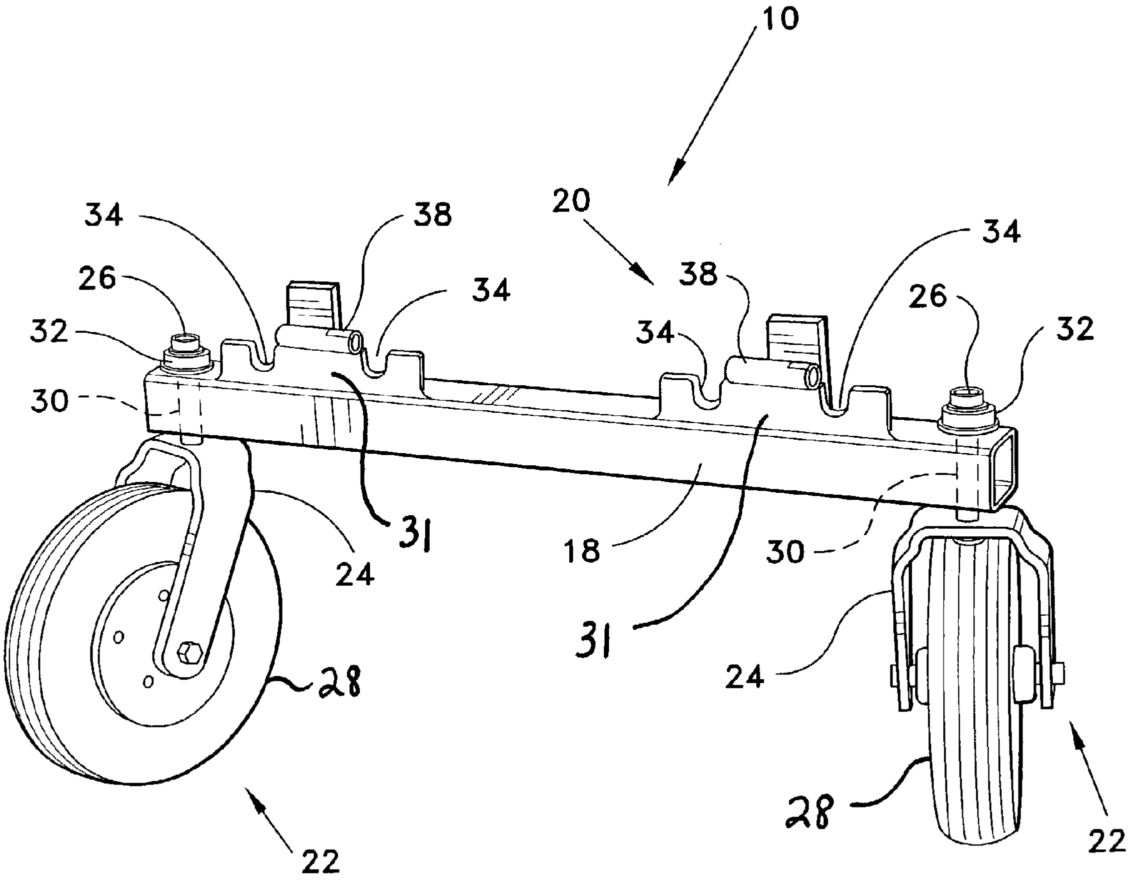
FIG. 2 is a perspective view of a front dolly device according to the present invention.
Figure 3:
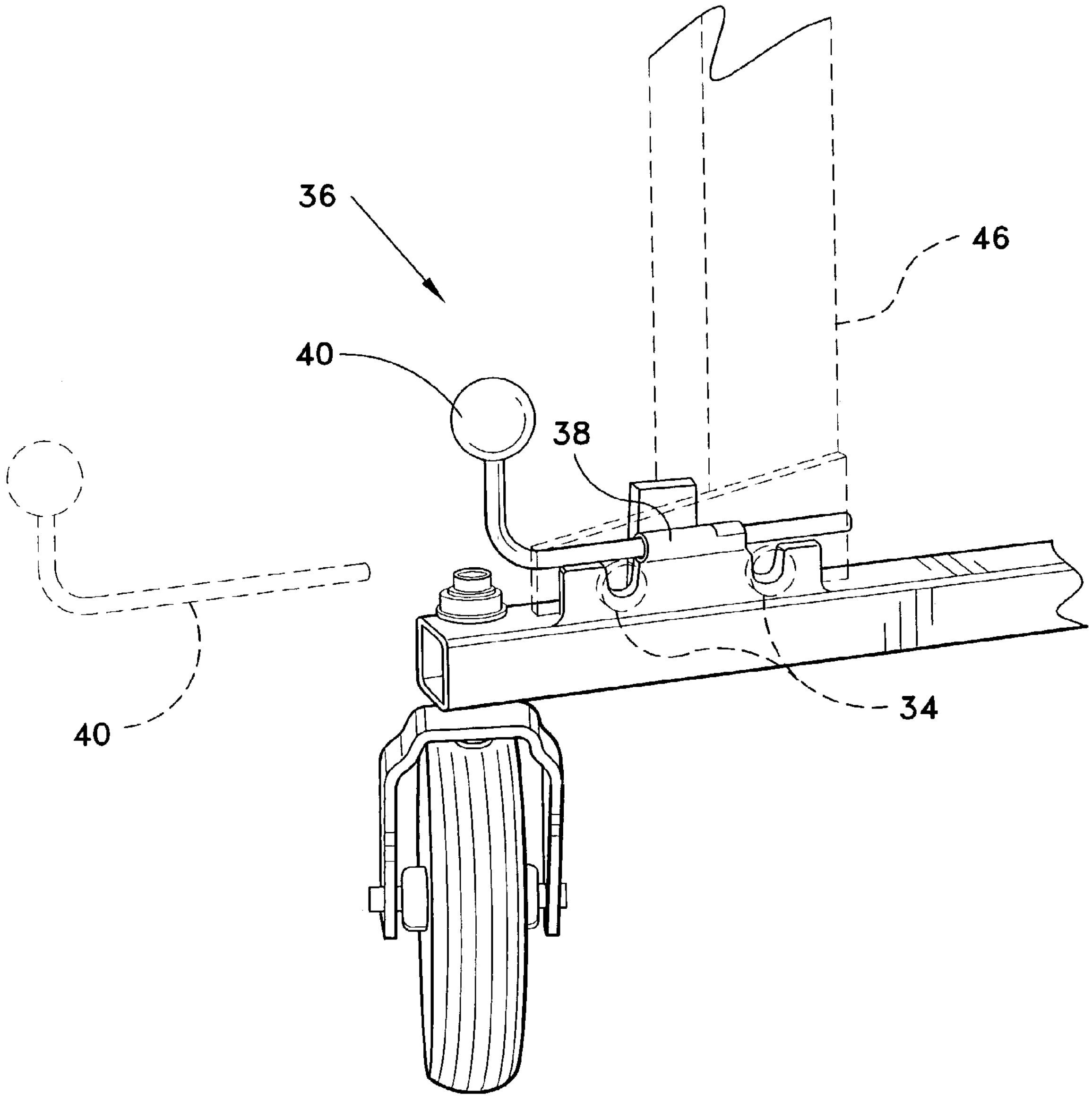
FIG. 3 is a fragmented, perspective view of the front dolly device showing the locking mechanism which secures the bed to the dolly.
Figure 4:
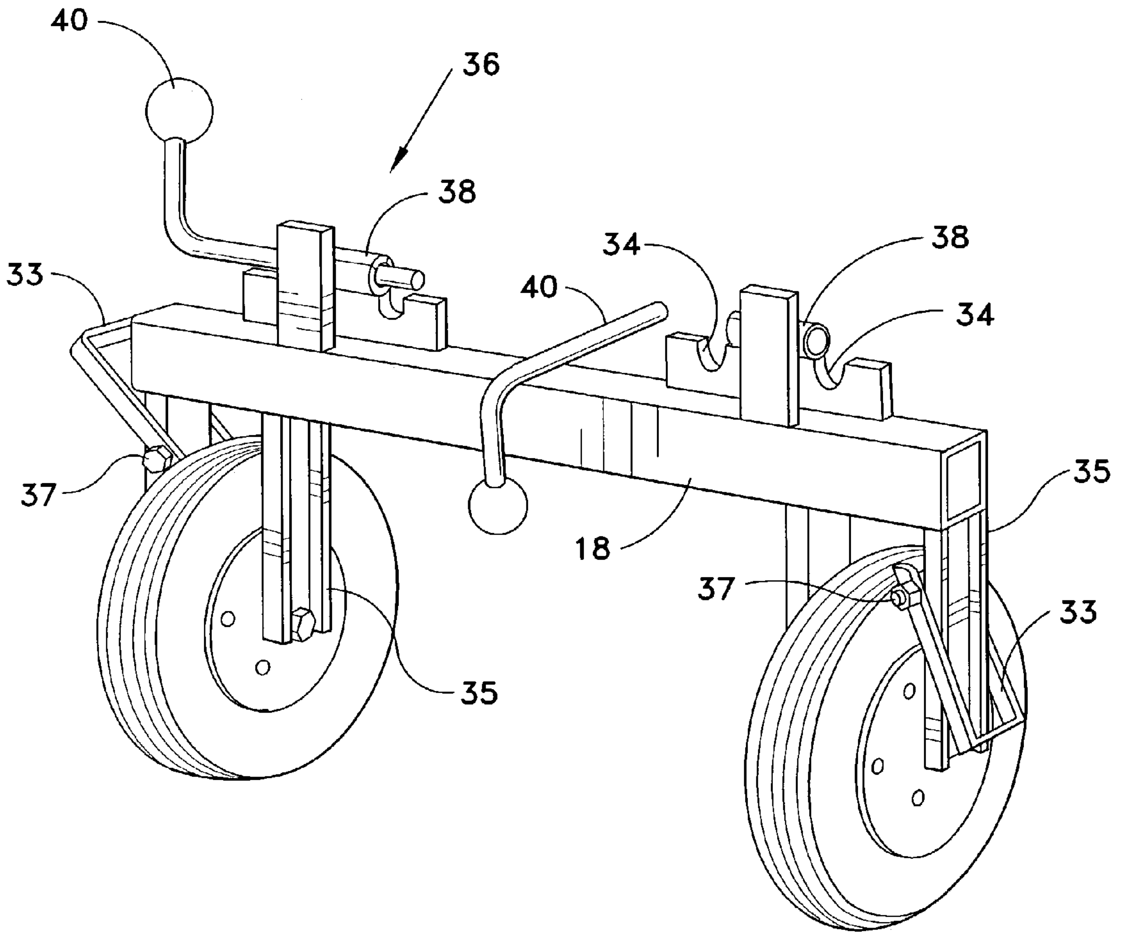
FIG. 4 is a perspective view of the rear dolly device according to the present invention.

The present invention is a heavy bed transporting device, designated generally as 10 in the drawings, which comprises, in combination, a pair of dolly devices, including a front dolly device and a rear dolly device, respectively indicated as 11 and 12, and which is specifically configured for moving a hospital bed 14. As best shown in FIGS. 2–4, each dolly device has a horizontal base member 18 and a pair of connecting structures 20 affixed to the upper surface thereof. The front or proximal dolly device is equipped with a pair of swivel-mounted wheels 22 attached to the lower surface of the horizontal base member 18.

Each swivel-mounted wheel 22 has a bracket 24 rotatably attached to the horizontal base member 18 by a fastener 26 and a wheel 28 rotatably attached to the bracket 24. The fastener 26 may be an elongated element 30, such as a bolt having a threaded end, attached to the bracket 24 and extending through the horizontal base member 18 and being secured by a coupling element, such as a nut 32, attached to the upper end thereof. The elongated element 30 provides a vertical axis about which the bracket 24 rotates, while wheels 28 rotate about an axle extending horizontally through bracket 24.

As seen in FIG. 4, the rear fixed wheel dolly device is equipped with a manual braking system having two U-shaped brake levers 33 attached to the outer axle support members 35 by a bolt 37, the levers 33 pivoting about bolt 37. The brakes are activated by lifting the respective levers to the up position, causing the open end of the levers 33 to come into frictional contact with the wheels, thereby creating resistance to rotational movement. The brakes are deactivated by lowering the levers 33 and terminating frictional contact between the levers 33 and the wheels.

As best shown in FIGS. 2–4 each connecting structure 20 includes a retainer plate 31 having two retainer notches 34 defined therein to receive the bed as more fully described hereinafter. Each connecting structure further includes a frame lock 36 which consists of a hollow sleeve 38 mounted along the top edge of the retainer plate 31 between the notches 34 and an L-shaped retaining pin 40 (the pin 40 is omitted in FIG. 2 for clarity) which extends through the sleeve 38 and over the retainer slots. The two connecting structures 20 are disposed on opposite ends of the horizontal base member 18.

Figure 1:
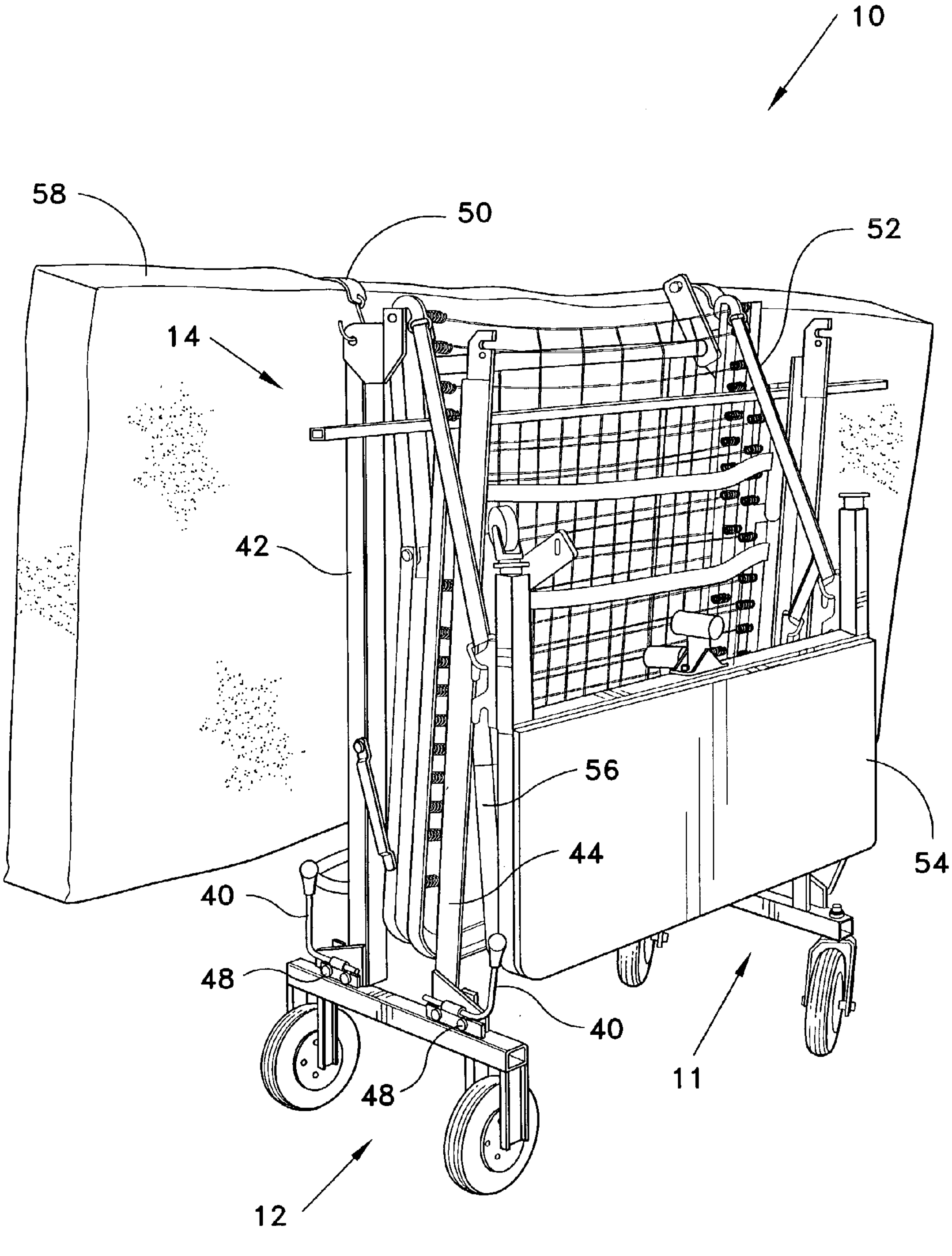
FIG. 1 is an environmental, perspective view of a heavy bed transporting device according to the present invention.

As shown in FIGS. 1 and 3, the bed 14 is placed in a vertical position and the dolly devices 11 and 12 are attached thereto. The bed 14 has two attachable/detachable rectangular frame elements, 42 and 44 respectively, each having a pair of connecting means 46 formed on opposite corners thereof in the form of two metal knobs 48 which project from the frame elements 42 and 44. The retainer notches 34 on the dolly devices receive the metal knobs 48 of the connecting means 46 which fit neatly into the notches 34. The L-shaped retaining pins 40 are then inserted into their respective sleeves 38 so that the pins 40 extend over the respective metal knobs 48 and secure the knobs 48 in place in their respective notches 34.

To affix the dolly devices to the bed 14, the rear dolly device 12 is first connected to a bed frame element 42 by sliding the knobs 48 into the notches 34 and securing the frame in place by inserting the L-shaped retaining pin 40. The frame element 42 is then rotated down, so that it rests on the dolly device 12. The opposite side of the frame element 42 is then lifted up and the front dolly device 11 is similarly attached to the opposite corner. The second frame element 44 is then placed on top of the two dolly devices, parallel to the first frame element 42, and the connecting knobs 48 are inserted into the remaining open retainer notches 34. L-shaped retaining pins 40 are again inserted through their respective sleeves 38 and over the knobs 48, securing the frame 44 to the dolly device. A strap 50 is then attached to the near side of the top of the second frame element 44 by way of a snap hook at the end of the strap 50. A second substantially identical strap 52 is attached to the far side of the top of the second frame element 44. Each respective strap 50 is equipped with two metal rings, one at the tip and the other slightly above, which attach to hooks on the backs of a detachable headboard element 54 and a detachable footboard element 56, respectively. The headboard and footboard elements are thus suspended from the two straps and hang flush against the first frame element 42. A mattress 58 may optionally be strapped against the frame element 44 by hooking two cords from the bottom of the frame element, on opposite sides thereof, over the mattress and connecting said cords to the top of the frame element.

Figure 5A:
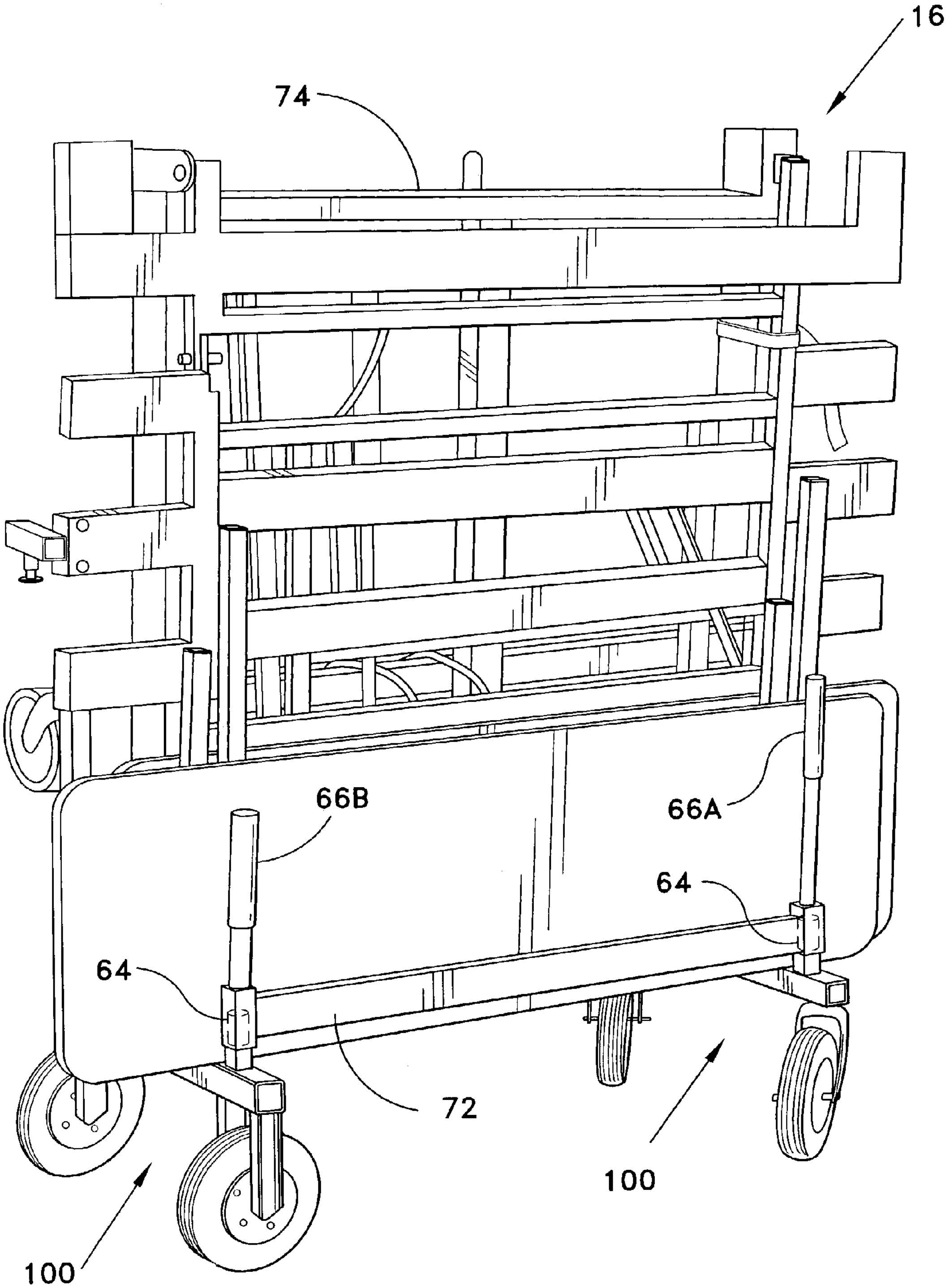
FIG. 5A is an environmental, perspective view of a second embodiment of the heavy bed transporting device according to the present invention.
Figure 5B:
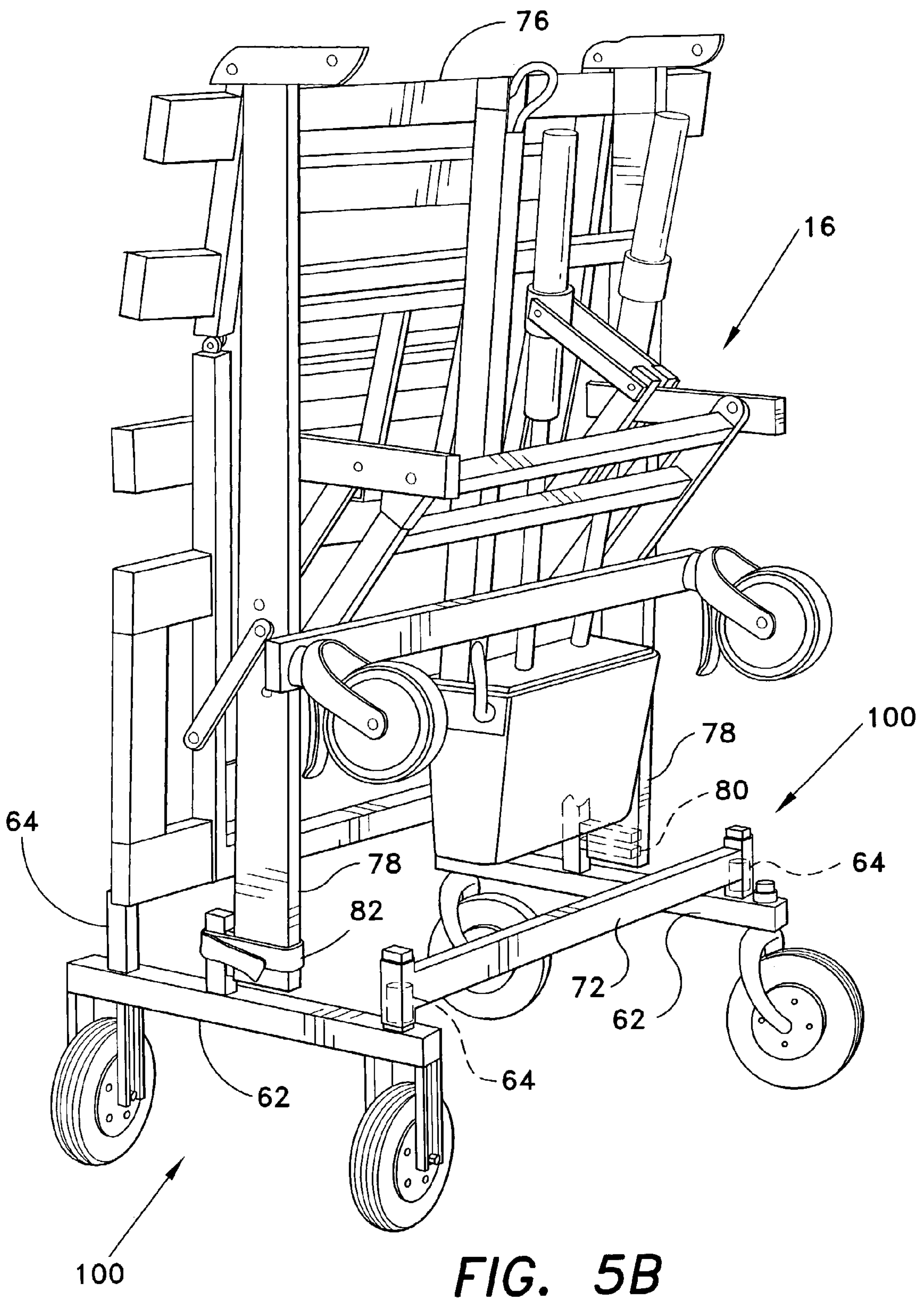
FIG. 5B is an environmental perspective view of the embodiment of FIG. 5B configured to transport another portion of the hospital bed.
Figure 6:
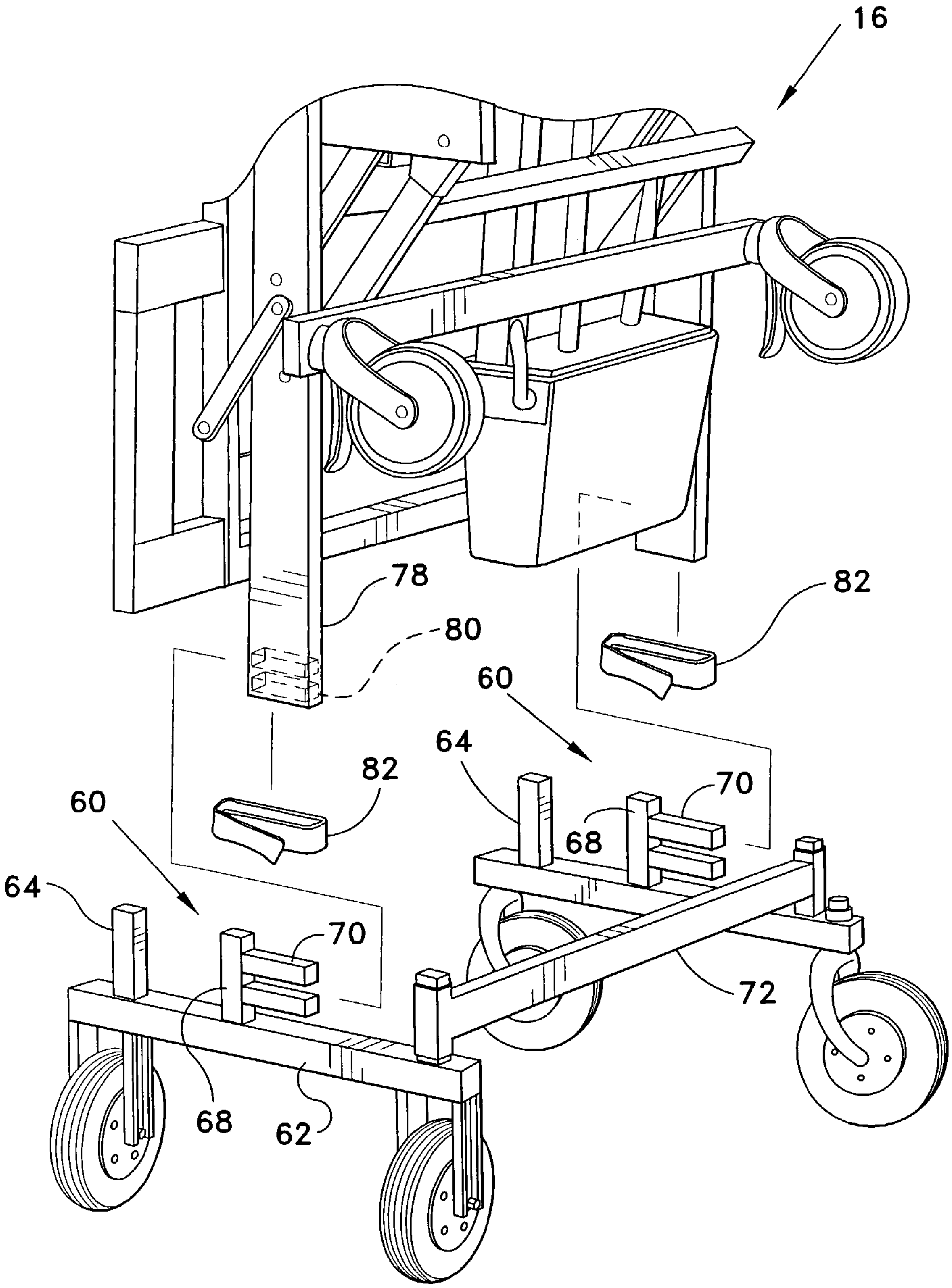
FIG. 6 is an exploded, perspective view of the second embodiment of the bed transporting apparatus according to the present invention.

In an alternate embodiment, shown in FIGS. 5A, 5B and 6, the dolly devices 100 are equipped with a connecting structure 60 advantageously adapted to attach to the frame of an electric hospital bed 16. In this embodiment, the dolly devices 100 comprise a horizontal base member 62 with two vertical members 64 affixed to the upper surface thereof and on opposite sides. The connecting structure 60 comprises a vertical member 68 with two horizontal prongs 70 which is disposed in the center of the horizontal base member 62. As seen in FIGS. 5A, 5B and 6, a horizontal member 72 having openings on either end, connects the two dolly devices by sliding the openings over a vertical member 64 on each dolly. Hollow pole members 66A and 66B are then inserted into sleeves disposed at the ends of the vertical members to provide support for the bed frame as it rests upon the dollies.

The electric hospital bed 16 to which this embodiment attaches comprises two attachable/detachable frame elements, 74 and 76 respectively, each having a pair of centrally disposed post members 78 with horizontal slots at their respective ends 80. To affix the dolly devices to the bed, the horizontal prong members 70 on the connecting structure 60 are inserted into the horizontal slots disposed at the ends of the post members. In this way, the prong elements on each dolly 70 fixedly connect to the post members of the bed frame 78 and secure the frame 16 to the dolly devices 100. A strap 82 further secures the post members 78 to the connecting structure 60.

It is to be understood that the present invention is not limited to the embodiments described above, but encompasses any and all embodiments within the scope of the following claims.

I claim:

1. A heavy bed transporting device, comprising:

(a) a front dolly device having a horizontally disposed elongated base member and swivel-mounted wheels depending from opposite ends of the base member;

(b) a rear dolly device having a horizontally disposed elongated base member and fixed-mounted, unidirectional wheels depending from opposite ends of the base member; and (c) connecting means formed on opposite ends of each said base member for receiving knobs projecting from a frame of a hospital bed, each said connecting means comprising:

a retainer plate attached to the base member and having a pair of notches defined therein adapted for receiving the knobs projecting from the frame of the hospital bed and having a sleeve extending along a top edge of the retainer plate between the notches; and a retainer pin slidable through the sleeve and above the notches in order to retain the knobs in the notches.

2. The heavy bed transporting device according to claim 1, wherein each said retainer pin is L-shaped.

3. The heavy bed transporting device according to claim 1, further comprising a pair of straps adapted for attachment to opposite sides of the top of the bed frame member and for suspending a headboard and footboard member therefrom, said straps having a first end and a second end, and each strap further comprising:

(a) a snap hook attached to the first end of said strap; and (b) a pair of rings attached to said strap, one disposed at the second end of the strap and the other disposed slightly above said end, such that each ring engages a hook on the back side of the headboard and footboard respectively.

4. The heavy bed transporting device according to claim 1, further comprising a pair of elastic cords adapted for securing a mattress to the side of the frame member, said cords having a first end and a second end, and each cord further comprising a snap hook attached to both ends thereof, so that the cords may be attached to the top and bottom of the frame member, on opposite side thereof, with the mattress secured thereunder.

5. The heavy bed transporting device according to claim 1, wherein said rear dolly is equipped with a manual braking system.

* * * * *